(12) United States Patent
Lee

(10) Patent No.: US 7,467,561 B2
(45) Date of Patent: Dec. 23, 2008

(54) SIX-SPEED MANUAL TRANSMISSION

(75) Inventor: Byung Hyun Lee, Gunpo (KR)

(73) Assignee: Hyundai Motor Company, Seoul (KR)

( * ) Notice: Subject to any disclaimer, the term of this patent is extended or adjusted under 35 U.S.C. 154(b) by 26 days.

(21) Appl. No.: 11/593,263

(22) Filed: Nov. 6, 2006

(65) Prior Publication Data

US 2007/0137335 A1   Jun. 21, 2007

(30) Foreign Application Priority Data

Dec. 21, 2005   (KR) ...................... 10-2005-0126875

(51) Int. Cl.
*F16H 3/08* (2006.01)

(52) U.S. Cl. .......................... 74/329; 74/325

(58) Field of Classification Search .................. 74/325, 74/329, 331, 335
See application file for complete search history.

(56) References Cited

U.S. PATENT DOCUMENTS 3,916,712 A * 11/1975 Kelbel et al. .................. 74/410
5,445,042 A * 8/1995 Deady .......................... 74/329
6,095,001 A * 8/2000 Ruehle et al. ................. 74/331
6,647,817 B2 * 11/2003 Kobayashi .................... 74/359
7,255,018 B2 * 8/2007 Gumpoltsberger ........... 74/331
2003/0056612 A1 * 3/2003 Katakura ...................... 74/335
2003/0084738 A1 * 5/2003 Ishihara et al. ................ 74/329
2006/0123939 A1 * 6/2006 Akutagawa ................... 74/329

FOREIGN PATENT DOCUMENTS

JP   406201017 A * 7/1994
JP   2005-265143   9/2005

* cited by examiner

*Primary Examiner*—Roger Pang
(74) *Attorney, Agent, or Firm*—Morgan, Lewis & Bockius LLP

(57) ABSTRACT

In a six-speed manual transmission, a plurality of first synchronizers are disposed to an input shaft and at least one second synchronizer is disposed to an output shaft. Reflected inertia can be reduced, power delivery efficiency can be improved, and manufacturing costs can be reduced.

7 Claims, 1 Drawing Sheet

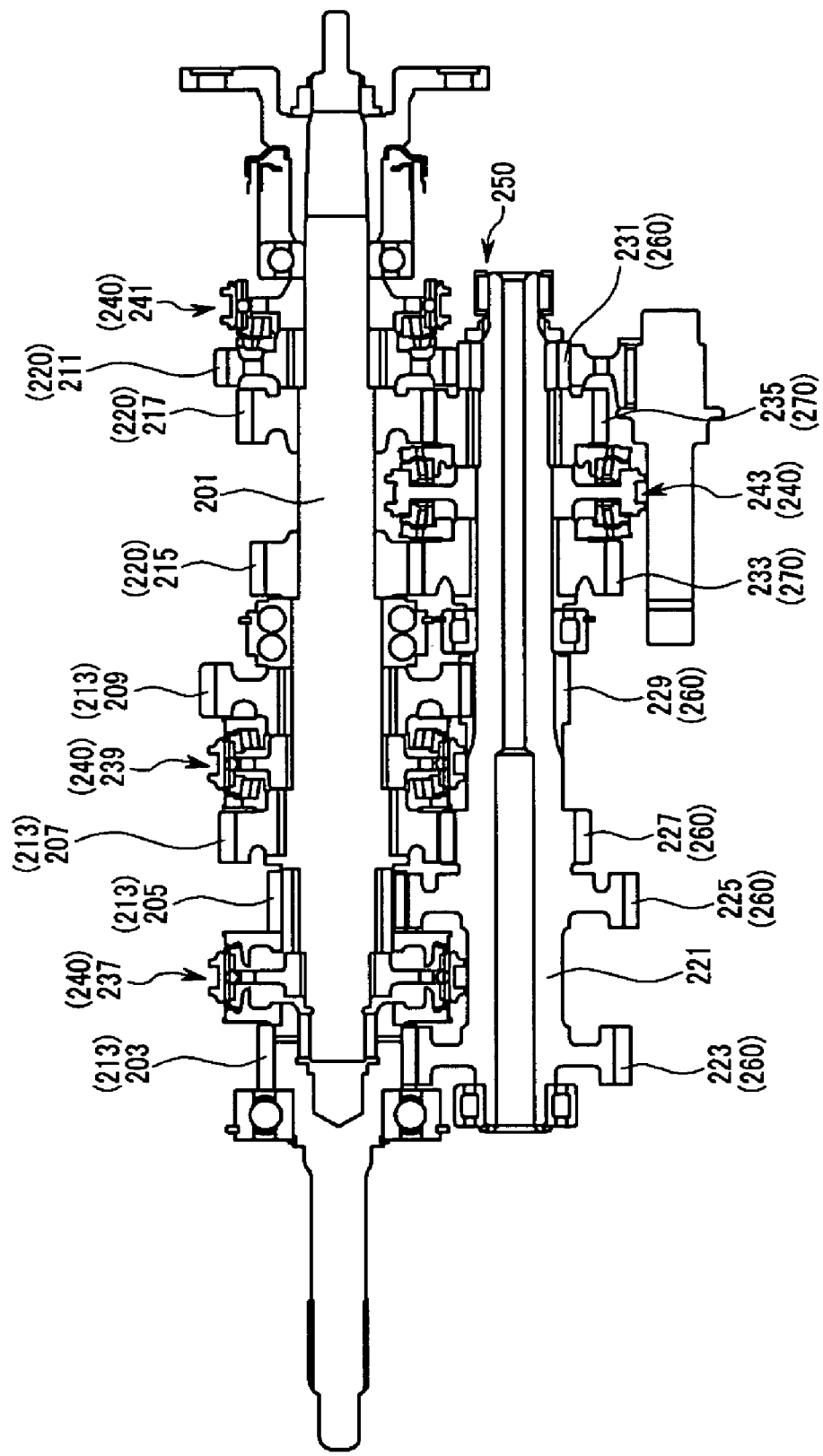

SIX-SPEED MANUAL TRANSMISSION

CROSS-REFERENCE TO RELATED APPLICATION

This application claims priority to and the benefit of Korean Patent Application No. 10-2005-0126875 filed in the Korean Intellectual Property Office on Dec. 21, 2005, the entire contents of which are incorporated herein by reference.

BACKGROUND OF THE INVENTION (a) Field of the Invention

The present invention relates to a six-speed manual transmission. More particularly, the present invention relates to a six-speed manual transmission that can reduce reflected inertia and fuel consumption, and also improve power performance.

(b) Description of the Related Art

Generally, a six-speed manual transmission is an apparatus for changing shift speeds by sequentially operating a control finger, a shift lug, a shift rail, and a shift fork when a driver operates a shift lever.

In prior art transmissions, because driven gears of a five-speed power train of the manual transmission are often integrally formed with the counter shaft, a problem can occur in that rotational inertia of the counter shaft can be large. Reflected inertia refers to an inertia force reversely transmitted from another constituent element to an input element in a power delivery apparatus. Thus, because rotational inertia of the counter shaft can be large, a problem can occur in that the reflected inertia can be large when gears are shifted. In addition, because the weight of the counter shaft can be large, problem can occur in that power delivery efficiency is reduced and costs increased.

In prior proposed solutions, the reflected inertia may be reduced by Disposing the fifth forward speed drive gear to the counter output shaft, however, in this case a problem can occur in that costs are increased because an additional synchronizer has to be mounted. As a result prior proposed solutions are less then satisfactory.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a six-speed manual transmission having advantages of reducing a reflected inertia and manufacturing costs, and also of improving a power performance.

An exemplary embodiment of the present invention provides a six-speed manual transmission variably transmitting a power including: a counter shaft; a plurality of first drive gears selectively engaged to the counter shaft such that the first gears selectively transmit the power shifted by predetermined speed ratios; at least one second drive gear integrally formed with the input shaft and transmitting the power of the input shaft; an output shaft receiving the power from the input shaft through the first and second drive gears; a plurality of first driven gears integrally formed with the output shaft and corresponding to the first drive gears; and at least one second driven gear selectively engaged to the output shaft to selectively receive the power shifted by the predetermined speed ratios.

The six-speed manual transmission further includes: a plurality of first synchronizers disposed to the input shaft and synchronizing rotation speeds of the first drive gear engaged to the input shaft and the output shaft in a case that one of the first drive gears is engaged to the input shaft to selectively receive the power; and at least one second synchronizer disposed to the output shaft and synchronizing rotation speeds of the second driven gear engaged to the output shaft and the input shaft in a case that the at least one second driven gear is engaged to the output shaft to selectively receive the power.

A bearing supporting the output shaft is mounted to one side of the output shaft and is realized by a needle roller bearing.

The first drive gears are disposed in an order of a fifth forward speed gear, a sixth forward speed gear, a second shift speed gear, a first forward speed gear, and a reverse speed gear from a front of the input shaft.

The second driven gears are disposed in an order of a fourth forward speed gear and a third forward speed gear from a front of the output shaft.

BRIEF DESCRIPTION OF THE DRAWINGS

FIG. 1 shows a six-speed manual transmission according to an exemplary embodiment of the present invention.

DETAILED DESCRIPTION OF THE EMBODIMENTS

An exemplary embodiment of the present invention will hereinafter be described in detail with reference to the accompanying drawings.

As shown in FIG. 1, according to an exemplary embodiment of the present invention, a six-speed manual transmission includes an output shaft 201, a plurality of first driven gears 213, at least one second driven gear 220, a counter an shaft 221, a plurality of first drive gears 260, and at least one second driven gear 270. A housing surrounding and supporting these components, as would be understood by a person of ordinary skill in the art, is not shown.

The plurality of first driven gears 213 are selectively engaged to the output shaft 201 to selectively transmit a power shifted by predetermined speed ratios.

At least one second driven gear 220 is disposed on the output shaft 201. The output shaft 201, receives the power from the counter shaft 221 through first and second driven gears 213 and 220. At least one first drive gear 260 is disposed on the counter shaft 221 and cooperates with the first driven gears 213. The drive gears and driven gears may be integrally formed with their respective shafts.

At least one second drive gear 270 is selectively engaged to the counter shaft 221 to selectively deliver the power shifted by the predetermined speed ratios. If the power is input from an engine (not shown) to the counter shaft 221, the counter shaft 221 rotates, and so the second drive gear 270 rotates with the counter shaft 221. The power input to the counter shaft 221 is transmitted to the output shaft 201 through the first driven gears 213 and the second driven 220.

According to an exemplary embodiment of the present invention, the six-speed manual transmission includes a plurality of first synchronizers 240 and at least one second synchronizer 243. The plurality of first synchronizers 240 are disposed to cooperate with the counter shaft 221. The first driven gears 213 are always engaged to the first drive gears 260 and only disposed to the output shaft 201. In addition, bearings are disposed between the first driven gears 213 and the output shaft. Therefore, the first driven gears 213 are slidably disposed on the output shaft 201. The power is transmitted through the counter shaft 221, the first synchronizers 240, and the first drive gears 260 sequentially. That is, the first drive gears are engaged to the counter shaft 221 through the first synchronizers 240.

The at least one second synchronizer 243 is disposed to cooperate with the counter shaft 221 and synchronize rotation speed of the second drive gear 270 in a case that at least one second drive gear 270 is engaged between the output shaft 201 to the counter shaft 221 to selectively receive the power.

When a driver operates a shift lever (not shown), a control finger, a shift lug, and a shift fork (not shown) are sequentially operated and a shift speed is realized by operation of the first and second synchronizers 240 and 243.

In one embodiment, the plurality of first driven gears 213 may include a fifth forward speed driven gear 203, a sixth forward speed driven gear 205, a second forward speed driven gear 207, a first forward speed driven gear 209, and a reverse speed driven gear 211. The fifth forward speed driven gear 203, the sixth forward speed driven gear 205, the second forward speed driven gear 207, the first forward speed driven gear 209, and the reverse speed driven gear 211 are sequentially disposed from a front of the output shaft 201.

The at least one second driven gear 220 may include a fourth forward speed driven gear 215 and a third forward speed driven gear 217.

The plurality of first drive gears 260 may include a fifth forward speed drive gear 223, a sixth forward speed drive gear 225, a second forward speed drive gear 227, a first forward speed drive gear 229, and a reverse speed drive gear 231. The at least one second drive gear 270 includes a fourth forward speed drive gear 233 and a third forward speed drive gear 235.

The fourth forward speed drive gear 233 and third forward speed drive gear 235 are sequentially disposed to the output shaft 221 from a front thereof.

The plurality of first synchronizers 240 may include a fifth forward speed and sixth forward speed synchronizer 237, a second forward speed and first forward speed synchronizer 239, and a reverse speed synchronizer 241, and each synchronizer 237, 239, and 241 includes two synchronizers or one synchronizer. That is, according to an exemplary embodiment of the present invention, the six-speed manual transmission may include five first synchronizers 240.

Each shift fork may be engaged to each first synchronizer 240.

That is, referring to FIG. 1, if the fifth forward speed and sixth forward speed synchronizer 237 moves left, a fifth forward speed shifting is realized, and if it moves right, a sixth forward speed shifting is realized. Similarly, if the second forward speed and first forward speed synchronizer 239 moves left, a second forward speed shifting is realized, and if it moves right, a first forward speed shifting is realized. In addition, if the reverse speed synchronizer 241 moves left, a reverse speed shifting is realized.

According to an exemplary embodiment of the present invention, a second synchronizer 243 may include a fourth forward speed and third forward speed synchronizer 243 and is disposed to the output shaft 221. That is, because only the fourth forward speed and third forward speed synchronizer 243 is disposed on the counter shaft 221, the weight of the counter shaft 221 becomes light and the rotational inertia amount, the reflected inertia, and manufacturing cost of the counter shaft 221 can be reduced. Therefore, power delivery efficiency of the counter shaft 221 can be improved. By way of illustration, according to an experimented result, the described rotational inertia amount is reduced by about 20%.

According to a further exemplary embodiment of the present invention, because a scheme of the six-speed transmission is not more complex than a fifth speed manual transmission of the prior art, manufacturing processes of the six-speed transmission is simplified. In addition, according to an exemplary embodiment of the present invention, because sixth forward speeds can be realized, climbing performance and a highest speed of the vehicle can be improved.

In one embodiment, the fourth forward speed and third forward speed synchronizer 243 may include two synchronizers, and if the fourth forward speed and third forward speed synchronizer 243 moves left, a fourth forward speed shifting is realized, and if it moves right, a third forward speed shifting is realized. In addition, according to an exemplary embodiment of the present invention, because the fourth forward speed and third forward speed synchronizer 243 is disposed to the counter shaft 221, one shift fork is located to the fourth forward speed and the third forward speed synchronizer 243.

The shift fork may be arranged by a person of an ordinary skill in the art, based on the teachings contained herein and as such further detailed description of the shift fork is omitted.

Because the second driven gear 220 rotates with the output shaft 201, if the fourth forward speed and third forward speed synchronizer 243 moves left, the rotation speeds of the output shaft 201 and the counter shaft 221 are synchronized and the power is transmitted from the fourth forward speed drive gear 233 to the fourth forward speed driven gear 215. In addition, if the fourth forward speed and third forward speed synchronizer 243 move right, the rotation speeds of the output shaft 201 and the counter shaft 221 are synchronized and the power is transmitted from the third forward speed drive gear 235 to the third forward speed driven gear 217.

Power delivery from the first drive gears 260 to the first driven gears 213 will be understood by a person of an ordinary skill in the art based on the teachings contained herein, therefore further detailed description is omitted herein.

A bearing 250 supporting the counter shaft 221 may be mounted to one side of the counter shaft 221 In one embodiment, bearing 250 may be a needle roller bearing. A needle roller bearing 250 has a small volume and weight and therefore the weight of the counter shaft 221 can be further reduced. Therefore, the rotational inertia, the reflected inertia, and the manufacturing cost of the counter shaft 221 can also be further reduced.

According to exemplary embodiments of the present invention, because the synchronizer is disposed to the output shaft, the rotational inertia, the reflected inertia, and the manufacturing costs of the output shaft can be reduced.

In addition, power delivery efficiency of the manual transmission can be improved and because the sixth forward speed shift can be realized, climbing performance and highest speed of the vehicle can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A six-speed manual transmission, comprising:
an output shaft;
a plurality of first driven gears selectively engaged to the output shaft such that the first driven gears selectively transmit power shifted by predetermined speed ratios;

at least one second driven gear disposed on the output shaft and transmitting power to the output shaft;

an axially hollow counter shaft transmitting power to the output shaft through the first and second driven gears;

a plurality of first drive gears disposed on the counter shaft and corresponding to the first driven gears, said first drive gears including a reverse speed drive a gear fixed to the counter shaft; and at least one second drive gear selectively engaged to the counter shaft to selectively transmit power shifted by the predetermined speed ratios, wherein said at least one second drive gear includes a gear axially supported by the reverse speed drive gear.

2. The transmission of claim 1, further comprising:

a plurality of first synchronizers disposed to cooperate with the output shaft and synchronizing rotation speeds of the first driven gear engaged to the output shaft and the counter shaft in a case that one of the first driven gears is engaged to the output shaft to selectively receive the power; and at least one second synchronizer disposed to cooperate with the counter shaft and synchronizing rotation speeds of the second drive gear engaged to the counter shaft and the output shaft in a case that the at least one second drive gear is engaged to the counter shaft to selectively receive the power.

3. The transmission of claim 1, wherein: the first driven gears are disposed in an order of a fifth forward speed gear, a sixth forward speed gear, a second shift speed gear, a first forward speed gear, and a reverse speed gear from a front of the output shaft.

4. The transmission of claim 1, wherein: the second drive gears are disposed in an order of a fourth forward speed gear and a third forward speed gear from a front of the counter shaft.

5. The transmission of claim 1, wherein said at least one second driven gear is integrally formed with the output shaft.

6. The transmission of claim 1, wherein at least one said first drive gear is integrally formed with said counter shaft.

7. The transmission of claim 1, wherein said gear axially supported by the reverse speed drive gear is a third forward speed drive gear.

* * * * *